(12) United States Patent
Baker

(10) Patent No.: X8704
(45) Date of Patent: Mar. 20, 1835

(54) PRESS, COTTON & HAY, &C.

(76) Inventor: Samuel T . Baker and useful Machine for compressing Hay, Cotton, Hops, Cider, and
all other compressible commodities, and that the following is a full and
exact description thereof.

(The foundation of the press consists of two sills of about six feet in
length six inches square or any convenient bigness. to these sills are framed
four posts, or plank in an upright position, sufficiently apart as to admit
or correspond with box, and of any convenient length, so as to agree with the
hight of the box extending about fifteen inches above the same. The box
may be made in any convenient manner so as to apply to the commodity
to be pressed, or of about eight or nine feet in length or height, three feet
eight inches in width, and two feet and one half deep. To the sills are
framed two pieces of joist about five feet and half long in a horizontal
manner connecting the sills to which the lower part of the box is secured at
each side. Above these, and on each side, are three pieces of the same di-
mensions, and at a proper distance from each other, the ends extending
through the post, and made fast to the same, and enclose the box at both
sides. Inside of the posts, and within eight or ten inches of the same,
are framed four pieces of joist, of about the same bigness, two feet and
half long inside the shoulder, and are framed into the aforementioned
joist, and enclosing or hooping the box. The box is so constructed as to ad
mit of two followers at the same time, one forcing down & the other up.
The doors are in centre of the box on both sides. The doors might be hung
at the side of the box, and secured by iron or wooden bars and hinges.
The box has four slips or slides, two at each end, so as admit of the foun-
dation of the lower follower to pass up and down. The followers are drawn
up and down at the same time by means of ropes or chains that are attached
to two horizontal shafts. These shafts extends through the upper part of the
posts in such a manner as to leave the top of the box clear when the upper fol-
lower is turned out. The two horizontal shafts produce a reaction when
set in motion and are capable of producing double the power that they
otherways would and destroys the friction, likewise to the ends of
these shafts are fixed cog wheels of about two feet [illegible] in diameter, or large or smaller as the case may require out side of posts, these two cog-
wheels match into a pinion that is fast to another wheel, and this
wheel matching into another short shaft on which is a pinion this shaft
being set in motion by the large wheel on the side, one end of this lower shaft
passes through a perpendicular post that is secured at the bottom by a side
sill, or a small sill that is attached to one of the lower sills, at the top is a
piece framed in crossway and secured at each end by the ends of the shafts
running through and are secured by pins the lower shaft and the [illegible] or
shaft of the [illegible] that matches into the short shaft, the outward ends of
the same pass through a [illegible] post, and the other ends turn in pieces that
are framed acrost the posts. The upper follower is constructed by fra-
ming four pistons upon the follower at or near the corners of the same acrost
the tops of these pistons are fixed two pieces of joist of sufficient strength and extend-
ing sufficiently over the shafts so as to receive the ropes or chains in a per-
pendicular position, to one of these shafts is attached a rope or chain
and extending to the follower and winding the revers to the other ropes
or chains brings the follower back, and when it is at or near the top
of the box, the ropes or chains being sliped of from one side, the follower
is turned out of the way without trouble. This machine can be made
to work with cogs, aplying them at both sides of the pistons or slides to
draw down, or they may be applyed to pistons that are or may be attached
to the lower follower and drawn up and down at the same time, or sep-
arately with rollers at the back part of of the slides; Or to increas the
power there may be the same wheels and pinions attached to the other
side or ends of the shafts and in this way give double the power, or they
may be at the end of one shaft one way and at the other end the other.
The cogwheels and pinions to be either of iron or woode.

A machine constructed with this two fold power or the reaction
of the one follower upon the other arising from the opperation of the one
upon the other with ropes, cogs or chains, can be made one of the most pow-
erful engines of compression without injury to the machinery.

What I claim as my own invention and not previously known

United States Patent

Patent No.: X8704 in the above described machine, is the application of the two horizontal shafts in the manner described, the reaction they produce in forcing the followers up and down, and the operation of the machine with regard to the double applyed power, or with the action of one shaft forcing the followers up and down at the same time.

Witnesses
Thomas Johns
Henry Stone

Samuel T. Baker

Exd. W.G.C. Patented March 20th 1835 (1064 words)